United States Patent [19]

Javan

[11] Patent Number: 4,893,923
[45] Date of Patent: Jan. 16, 1990

[54] DOPPLER LASER RADAR SYSTEM

[75] Inventor: Ali Javan, Cambridge, Mass.

[73] Assignee: Laser Science, Inc., Cambridge, Mass.

[21] Appl. No.: 915,650

[22] Filed: Oct. 6, 1986

[51] Int. Cl.$^4$ ............................ G01P 3/36; G01C 3/08
[52] U.S. Cl. ........................................ 358/28.5; 356/5; 342/58; 342/109
[58] Field of Search ............... 342/13, 47, 58, 142, 342/127, 192, 82; 356/5, 28.5; 331/3, 44

[56] References Cited

U.S. PATENT DOCUMENTS

| | | | |
|---|---|---|---|
| 3,115,627 | 12/1963 | Pierce | 342/192 X |
| 3,150,363 | 9/1964 | Finvold | 342/192 X |
| 3,487,462 | 12/1969 | Holberg | 342/127 X |
| 3,600,090 | 8/1971 | Wood et al. | 356/5 |
| 3,686,585 | 8/1972 | Javan et al. | 372/32 |
| 3,875,399 | 4/1975 | Teich | 356/285 X |
| 3,916,410 | 10/1975 | Elwood | 342/112 D |
| 3,947,630 | 3/1976 | Javan | 350/3.66 X |
| 4,107,674 | 8/1978 | Funatsu et al. | 342/82 X |
| 4,146,848 | 3/1979 | Hellwig et al. | 331/3 |
| 4,185,284 | 1/1980 | Vogel et al. | 342/47 X |
| 4,219,815 | 8/1980 | Fajen et al. | 342/58 |
| 4,323,860 | 4/1982 | Leiby, Jr. et al. | 331/3 X |
| 4,329,664 | 5/1982 | Javan . | |
| 4,405,230 | 9/1983 | Tew et al. | 356/5 |
| 4,454,482 | 6/1984 | De Marchi | 331/3 |
| 4,476,445 | 10/1984 | Riley, Jr. | 331/44 X |
| 4,515,471 | 5/1985 | Eden | 356/5 |
| 4,690,551 | 9/1987 | Edwards et al. | 356/5 |

OTHER PUBLICATIONS

Skolnik, Merrill I; *Introduction to Radar Systems*, Second Edition, 1980, pp. 553–570.

*Primary Examiner*—Thomas H. Tarcza
*Assistant Examiner*—Linda J. Wallace
*Attorney, Agent, or Firm*—Fish & Richardson

[57] ABSTRACT

A coherent laser radar system in which a number of individual receiver modules are deployed in an area relatively near the targets to receive signals originating at a transmitter located at a much greater distance from the target area. The radar is particularly adapted for the midcourse detection and tracking of missiles in space and differentiating between reentry vehicles and decoys. This permits a number of receivers to be positioned at separate points, each capable of receiving and analyzing reflected signals originating from a single transmitter. Direct communication between the transmitter and each receiver permits the transmitter to know at all times the location, velocity and direction of each receiver thus permitting the receivers to be positioned near the targets relative to the position of the transmitter. This in turn permits a wider divergence of the transmitted signal and markedly reduces the cost while making possible the simultaneous tracking and analysis of a number of targets thereby improving the performance of the system by a wide margin.

59 Claims, 3 Drawing Sheets

DOPPLER LASER RADAR SYSTEM

BACKGROUND OF THE INVENTION

1. Field of the Invention:

This invention relates to coherent laser radar systems capable of performing highly accurate Doppler observations in which a number of individual receiver modules are deployed in a region relatively near the targets to receive signals from targets illuminated by a laser beam from a master transmitter. The radar is particularly adapted for midcourse discrimination and tracking of missiles in space, differentiating between armed reentry vehicles and harmless decoys, and for fire control.

2. Brief Description of the Prior Art:

The problems in defending against a missile attack are formidable. A defense system must be able to cope substantially simultaneously with the possibility of hundreds of thousands of targets, each perhaps having an area of the order of one square meter, some of which are actual armed ICBM warheads while others are harmless decoys of similar dimensions and shape.

The Doppler frequency shift of a laser pulse can measure precisely the velocity component of a target in the direction of the return pulse traveling from the object to a receiver. The distance can be determined by the time delay of the received pulse.

To measure the velocity of a target by the Doppler shift with a high degree of accuracy requires laser pulses having high degree of frequency purity and stability. To resolve velocity in the range of one to ten cm/sec, a $CO_2$ laser radar operating at 10.6 um requires a frequency stability of 1-10 kHz using 10 to 100 usec pulses.

For range measurements, the transmitted pulse must be modulated with an appropriate wave format. To achieve a range resolution of 10 cm, the modulation period will be of the order of one nanosecond. In addition, to detect objects at a range of several thousand kilometers, the pulse-energy requirement is hundreds of Joules. Moreover, since a great deal is known about the target shape and its dynamic features, spinning rate, velocity, etc. it is possible to extract from the accurate range and Doppler measurements detailed information about the target beyond the limits set by the diffraction spread of the transmitted beam: this is known as range/Doppler imagery.

An armed warhead is considerably more massive than the decoys. In space trajectory, however, they will all move in unison and with the same speed. It is theoretically possible to impart momentum to the individual decoys and warheads in their midcourse trajectories in space, for example, by a cloud of dispersed particles intercepting their trajectories. This will cause small velocity changes to be induced in the individual targets as a function of the mass of each target, permitting discrimination by velocity signatures. In a range/Doppler laser radar, a low-power CW laser is used as a local oscillator (LO) for heterodyne detection of the radar return signal. The transmitter frequency must be stabilized at a fixed and known offset frequency from the local oscillator frequency, so that the Doppler shift of the return signal measured by the local oscillator frequency can be determined accurately. It follows that the transmitter and receiver LO cannot be operated independently as two separate units because of the necessity to maintain with precision the LO/transmitter frequencies at a fixed offset frequency by means of the well-known electronic AFC circuits. This requires that the receiver system must be physically adjacent the transmitter system. However, as is seen below, it is highly desirable to be able to separate the heterodyne receiver from the transmitter so that the two can be located in separate locations.

In the conventional approach, a single laser transmitter with its receiver is limited to examination of a single target with each transmitted laser pulse. For midcourse discrimination and tracking, however, a very large number of targets would have to be interrogated individually in rapid succession. This results in great complexity with respect to beam agility. In fact, problems encountered in range/Doppler discrimination and tracking with a conventional laser radar system are insurmountable.

Bistatic microwave radar has been used in which one or more receivers are positioned remotely from the transmitter. Such an arrangement has obvious advantages in increasing the observational ability if, for example, the receiver can be located near the target to receive a stronger return signal. However, microwave radars have been limited in the past to the detection of targets and are not used for accurate Doppler shift measurements. The discrimination and tracking of ICBM RV/decoys with a velocity resolution of 1 cm/sec requires accurate frequency measurements to within one part in $10^{10}$ or better. At microwave frequencies this will correspond to a change in frequency of a fraction of a cycle, which will be very small, requiring a long observation time. At IR frequencies, however, the 1 cm/sec accuracy will correspond to several kHz (and even higher for visible and near UV range/Doppler laser radar systems). The use of IR or short wavelength lasers provides a far more useful approach to range/Doppler measurements than the use of microwaves.

SUMMARY OF THE INVENTION

A feasible system to make use of range/Doppler radar for midcourse discrimination of reentry vehicles and decoys using Doppler signatures requires an energetic laser transmitter at a highly monochromatic and stable frequency that is of such size and construction that it can be flown in a conventional aircraft or space platform. It must also have the capability for simultaneous interrogation of a very large number of targets. In addition to velocity determinations, it is important to obtain information related to size, shape and other RV/decoy signature information.

As noted above, in the prior arrangements, it was necessary that the receiver with its LO and the transmitter be operated as an integral unit. The present arrangement permits the receiver with its local oscillator to be operated as separate units positioned some distance from the transmitter. Multiple receivers may be deployed to receive return signals from a single transmitter.

Direct communication, by radio or laser signals, between the transmitter and each receiver permits the transmitter to know at all times the location, velocity and direction of each receiver thus permitting the receivers to be positioned near the targets relative to the position of the transmitter. This in turn permits the use of a transmitter with a divergent beam illuminating a large number of targets with the same transmitted pulse. The receivers at close range to the targets have high resolution observational capability to interrogate a number of targets with a single transmitted pulse. Moreover, the receivers can be designed to have holographic capabilities.

DESCRIPTION OF THE PREFERRED EMBODIMENTS

As noted above, great benefits follow when the receiver with its local oscillator (LO) are operated independently as a unit, entirely separate from the transmitter. In this event, a range/Doppler laser radar can be realized with one master transmitter at a remote location from a multiple set of spaced receiver modules in different locations, including sensors intercepting the RV/decoys at close range. A one-master transmitter/-multiple receiver-system, diagrammatically indicated in FIG. 1, permits the radar returns from a single transmitted pulse to be multiply received and analyzed by a number of independently-operating receiver modules, generally indicated at 6, at different locations and near targets 12. In this embodiment the transmitter beam "b" from a transmitter 2 is broad enough that each pulse simultaneously illuminates a large number of targets. The deployment of the receiver modules in the proximity of the targets permits high resolution observation from a detectable received signal. The transmitter is no longer required to illuminate only a single target at one time. The use of multiple receivers makes optimal use of each transmitted pulse, which is so costly to generate.

In the one-master-transmitter/multiple-receiver system, the exact frequencies of the LO's in the receivers and the transmitter frequency become of prime importance. Each receiver must know the exact frequency of each transmitted pulse; otherwise the receivers cannot determine the exact Doppler shifts of the radar return signals. Precise Doppler measurements can be attained if the master-transmitter and the multiple receivers' LOs can be made to operate at the same frequency or with a constant and known frequency difference.

Such a transmitter/multiple-receiver system is made possible by providing an accurate optical clock 13 in each receiver module 6 (FIG. 2) and in the transmitter 2, with all of the clocks operating at exactly the same frequency. This permits the LOs and the transmitter frequencies to be set independently by their onboard optical clocks. For a 1 cm/sec velocity resolution, the desired absolute accuracy is 2 kHz (one part in $10^{11}$) for the $CO_2$ range/Doppler laser radar. It follows that the optical clocks must be accurate to 1 part in $10^{11}$ for such precise measurements. Less accurate clocks can be used in circumstances where a lesser degree of precision measurement of the Doppler shift is adequate.

In earlier work, the inventor introduced the technology for extending the microwave region absolute frequency measurements to the IR region. Since that time, considerable work has been done in this area by others as well. It is now possible to construct a frequency multiplier-synthesizer chain, diagrammatically illustrated at 14, which can compare an IR laser frequency with a primary cesium, Cs, standard clock at microwave X-band. The inventor also developed the technology for phase-locking an IR laser to a Cs clock to within the cesium clock's frequency accuracy, which is one part in $10^{11}$. These works have extended the microwave absolute frequency measurement technology to the IR and, now, to the visible and near UV regions.

It is also possible to operate a primary clock directly at an optical or IR frequency, notably the He-Ne (3.39 um) methane clock in the near-IR. The 3.39 um methane clock has an accuracy comparable to, and better than, the Cs clock.

A low power CW $CO_2$ laser (forming part of the receiver LO 16) can be phase-locked, via the multiplier/synthesizer chain 14, on the near-IR (3.39 um) methane clock, such as the clock 13, at better than one part in $10^{11}$. The phase-locked $CO_2$ laser can be used as a secondary reference clock. The secondary clock can be manufactured as a rugged and compact unit readily deployable in the transmitter/receiver system. Other clocks may also be used, including clocks operating directly at the $CO_2$ laser frequency by the $CO_2$ saturation resonance described by Javan and Freed in U.S. Pat. No. 3,686,585.

In the $CO_2$ transmitter/multiple receiver system, the transmitter and each receiver carries an onboard He-Ne (3.39 um) methane or other appropriate clock 13 (FIG. 2), 42 (FIG. 3), respectively. The receiver LOs 16 and the transmitter 2 are phase-locked on their onboard clocks. Absolute accuracy and stability of one part in $10^{10}$–$10^{11}$ are readily attained, enabling Doppler velocity measurements at 1–10 cm/sec accuracy.

In one proposed application, a number of clocked receiver modules intercept the RV/decoys 12 in midcourse at, for example, a 100 km range, with the transmitter 2 located at an approximate range of 3,000 km. This arrangement resolves many of the transmitter beam-steering and search problems. The angular spread of the transmitted beam, illuminating a number of RV/decoys 12 along its line of sight, will determine the intensity of the radar return-signal in each intercepting receiver module 6; the narrower the beam, the larger will be the received signals from the illuminated targets. Consider first the transmitter beam divergence to be set for a detectable radar return from the RV/decoys 12 at the 3,000 km range. For this, the intercepting receivers 6 at a 100 km range from the RV/decoys receive a much larger radar return because of the $1/R^2$ (not $1/R^4$) range dependence.

It follows that the intercepting receiver (at 100 km range) will receive about $30^2$ or about 1000 times greater signal than would a receiver in the vicinity of the transmitter. This permits the angular spread of the transmitted beam to be opened up by a factor of about 30, while leaving the signals at the intercepting receivers well detectable (recognizing that any receivers at the transmitter location will lose the radar return signals). With a more powerful transmitter, a wider angular spread can be used, making it possible to illuminate a larger number of RV/decoys with each transmitted pulse. As noted above, in the conventional approach, an ideal transmitter would have to interrogate each RV/decoy, one at a time, with frequency revisitations for tracking.

Each intercepting receiver module is in laser/radio contact with the master transmitter. It also carries an onboard inertial guidance 18 (FIG. 2), or other means of establishing a directional reference axis, as well as other sensors 22 for performing low-resolution observation. A signal processor and transmitter 20 provides the data link back to the transmitter 2. The receivers 6 can direct their receiving optics, diagrammatically illustrated at 24, onto the RV/decoy illuminated volume, initially guided by the sensors 22 at lower angular resolution in the receiver module 6. The laser/radio contact with the transmitter will also set an internal GHz clock (not shown) in each receiver for range measurements.

The system can be put into use in several ways. An example is given below to indicate the broad possibilities.

In one approach, the transmitter 2 serves two primary functions: (a) it illuminates a number of RV/decoy targets 12 with each pulse for range/Doppler observation by the intercepting receivers, and (b) it conducts range/Doppler measurements on each of the intercepting receivers, each of which is equipped with a retro-reflector 8 that greatly enhances the radar return signal back to the transmitter.

In this arrangement, the transmitter 2 has data at each moment indicating the coordinate and trajectory of each of the intercepting receiver modules 6. In turn, each receiver having performed the discrimmination function, will determine the target coordinate and trajectory (via range/Doppler) with respect to its own coordinate and trajectory.

This information may be relayed to the location of the master transmitter 2 where it is combined with coordinate and trajectory information of the particular receiver module to locate a target and perform high-accuracy Doppler measurements. Alternatively, the information about the trajectory and coordinate of a particular receiver module may be relayed from the master transmitter to the receiver to be combined with the target information gathered by the receiver.

One prime advantage of this arrangement is the greatly increased observational resolution by the receivers at relatively close range to the target. The receiver may use imaging optics, described below, with a two-dimensional mixer/detector array, diagrammatically illustrated at 26, in its image plane. Such a receiver at a close range (for example, about 100 km) from the RV/decoy targets has a broad field of view, intercepting the radar return signals from a number of RV/decoy targets simultaneously. Its two dimensional image array 26, however, provides the capability to resolve the individual RV/decoy images on its image plane as described below. The broad receiver field of view together with the relatively broad transmitted beam (illuminating a number of RV/decoys with each pulse) greatly simplifies the transmitter beam-steering, and the coordinated scanning.

For the receiver, a coherent (heterodyne) imaging approach is preferred, in which a two-dimensional array of mixer elements (not illustrated individually) is placed on the receiving optics image plane 26, with the same local oscillator 16 illuminating the entire array. Each mixer element in the array 26 provides range/-Doppler information for the target image focused on it. In this way, each receiver has a broad field of view (fov) determined by the size of the array: its resolution for each mixer element on the image plane, however, will be as high as the diffraction effect of its receiving optics and the individual mixer area of the array will permit. A one-meter receiver optics at 100 km range will resolve an individual RV/decoy at a 10 um $CO_2$ wavelength. Such a receiver is able to interrogate a number of RV/decoys simultaneously, performing range/Doppler measurements on each target. With a near-UV excimer (KrF at 0.25 um) one-master-transmitter/-separate-receiver system, it is possible to resolve a surface area as small as several square centimeters of an RV/decoy target. The resolution will increase at closer ranges.

In the preferred system, rapid beam agility is no longer needed, since the transmitter 2 illuminates a large number of targets simultaneously. Each receiver, because of its broad fov and proximity to the target, is able to resolve a large number of individual targets simultaneously.

Considering the above, the transmitter 2 is not necessarily required to be placed in a space platform. It can be carried, for example, in an aircraft at a sufficiently high altitude that the broad transmitted beam will not be subjected to the atmospheric turbulence and laser blooming effect. The receiver modules 6, on the other hand, can be deployed in space orbits relatively near the targets 12. In midcourse, for example, there is at least hundreds of seconds of time available for the receiver modules to be put into appropriate orbits at close range to the RV/decoys illuminated by the master transmitter. Moreover, the orbits of the receiver modules can be selected so they will follow the orbits of the RV/decoys in a chase mode.

Several master transmitters each operating at a different $CO_2$ wavelength (or UV wavelengths) can be used to illuminate the different sectors of the RV/decoy distribution area. Each transmitter has its own set of receiver modules placed in appropriate orbits. The one-master-transmitter/multiple-receiver system can be scanned in a coordinated fashion to follow the RV/decoys.

The discrimination and tracking will be implemented in an interactive scenario. For this, a number of ways have been proposed to impart momentum to the RV/decoys by the impact of small particles such as sand, aerosols or other materials. As noted earlier in this disclosure, the momentum transfer will induce slightly different velocity change in the heavy armed warheads than in the lighter decoys. Precise Doppler measurements will detect the velocity changes induced in each RV or decoy. This together with the imaging capability provides signatures for discrimination.

In the coherent imaging system described above, two-dimensional arrays of small area detectors are used in the image plane 26, all of which is illuminated uniformly by the same LO output beam. This permits the phase distribution of images of the target objects on the two-dimensional array 26 of detectors to be measured, along with the amplitude distribution in the image plane. For this it is necessary that the individual elements of the two-dimensional array in the image plane be located as phased arrays in precisely known locations. The system described permits holographic observations to be made of the received signal, as described in the U.S. Pat. No. 3,898,453 to Javan.

The phase information can be obtained from heterodyne signals in each element of the array. Or it can be obtained from amplitude distribution across the image plane produced by the interference pattern of the local oscillator illumination and the image.

The system described gives real-time holographic information which can be processed in rapid succession to obtain detailed two-dimensional information of a moving object. The detector arrays can be optical-electronic arrays described in the above-referenced patent, or other small area detectors. It can be used in either the IR or visible light regions.

The phase distribution of an optical image contains an enormous amount of information about the object of the image. For some applications, however, it is possible to use a transmitter which operates at two wavelengths having a difference frequency in the microwave or millimeter range (for example, two different $CO_2$ transitions). In such a system, two LO's are needed to illuminate the image plane in order to receive the radar return signals separately at the two wavelengths. Each LO will be at a wavelength close to one of the two transmitted wavelengths for differentiation. This will permit the phase distribution across the image plane to be obtained at the beat frequency between the two transmitted beams (in the microwave or millimeter range) permitting a two-dimensional array which is phased at the wavelength corresponding to the beat frequency.

The system described, with the imaging range/Doppler receivers at close range to the RV/decoys, can respond to and perform diagnostics on the following signatures: (a) target Doppler spectrum; (b) shape; (c) size; (d) acoustic ringing in RVs, induced by external impulses; (e) flexing; and (f) speckle phenomenology. With a multiplicity of receivers and at high PRF, a large number of RV/decoys can be interrogated. Moreover, it is possible to use several transmitter/multiple-receiver systems (at different wavelengths), with each system performing discrimination and tracking on a different section of the RV/decoys. Once the identifications are made, laser designators on board the receiver sensor modules can selectively illuminate the RVs, for homing in the kill mechanism.

Figure 1:
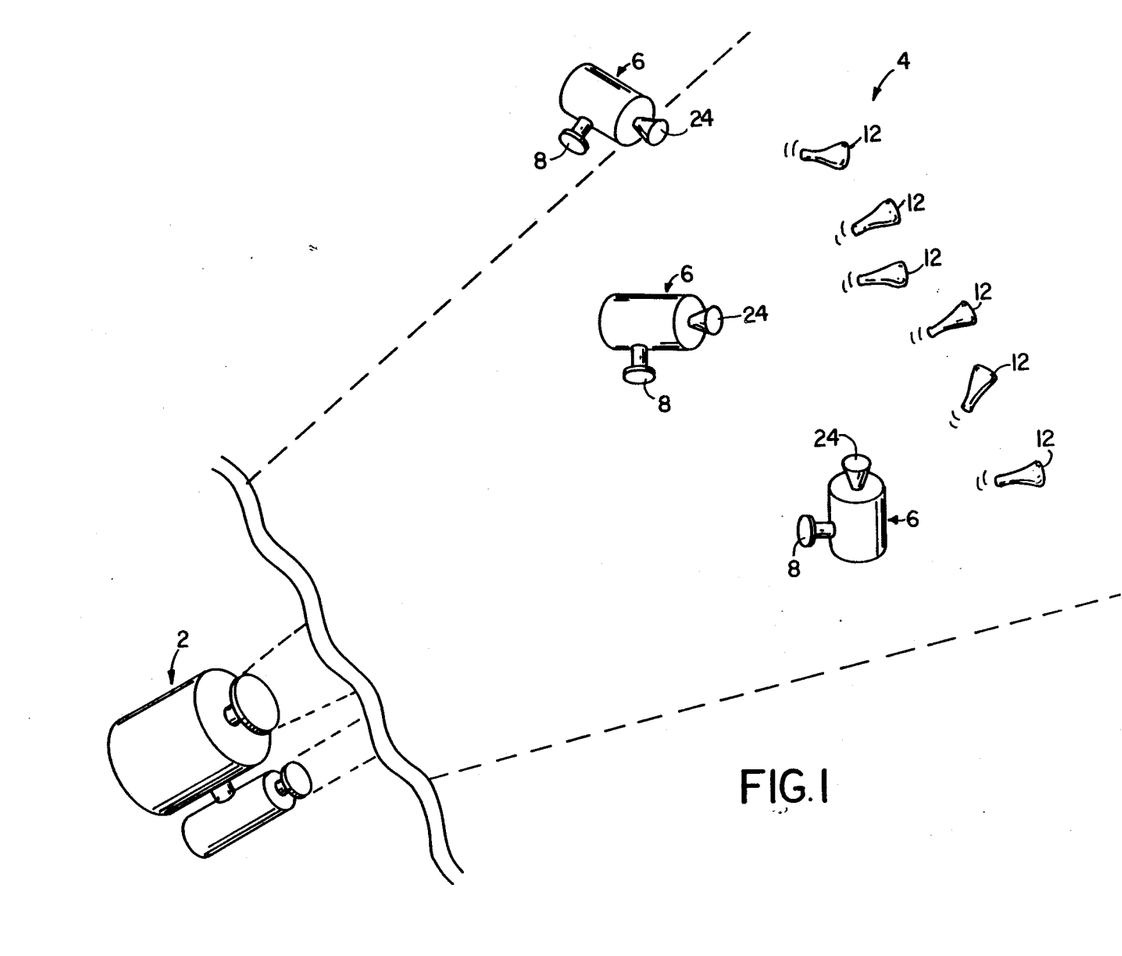
FIG. 1 is a diagrammatic representation of a coherent laser radar system embodying the invention.

The operational system is indicated diagrammatically in FIG. 1 in which a transmitter 2 may be located at a range of, say, 3,000 km from the target area, generally indicated at 4, while three receivers 6 are dispersed at a range of about 100 km from the target area. This transmitter 2 may, for example, have a pulse energy of 100–500 Joules, a pulse length of 10–100 microseconds and a frequency stability of 1–10 kHz.

The angular spread of the transmitted beam "b", which is capable of illuminating a number of targets 12 along its line of sight, determines the intensity of the radar return-signal at each intercepting receiver.

The receivers 6 may be at fixed locations but under actual operational conditions are more likely to be positioned in space. In the latter circumstance, each intercepting receiver will be in laser/radar contact with the master transmitter 2 and will carry the onboard inertial guidance 18 (FIG. 2), or other means for establishing a directional reference axis. Each receiver module 6 includes the secondary sensor system, indicated diagrammatically at 22, performing low-resolution observations. The receiver 6 can then direct its associated higher-resolution receiver optics, generally indicated at 24, onto the illuminated array 26, initially guided by the lower-resolution sensor 22. A laser/radio communication link between the transmitter 2 and a synchronizing receiver 28 sets the internal GHz clock (not shown) in each receiver for range measurements. The two dimensional array 26 of mixer elements that is placed on the optics image plane is described in U.S. Pat. No. 3,947,630 to Javan. Other types of high-speed small-area mixer elements can be used in a two-dimensional phased-array configuration in the image plane. In the visible or near UV, for example, the elements can be small-area photo-conductive detector elements.

The transmitter 2 (see also FIG. 3) consists of a one-joule master oscillator power amplifier 32 driven by a CW laser oscillator 34. The signal from the amplifier 32 drives a power amplifier 36 that delivers an output pulse-energy of several hundred joules.

Figure 3:
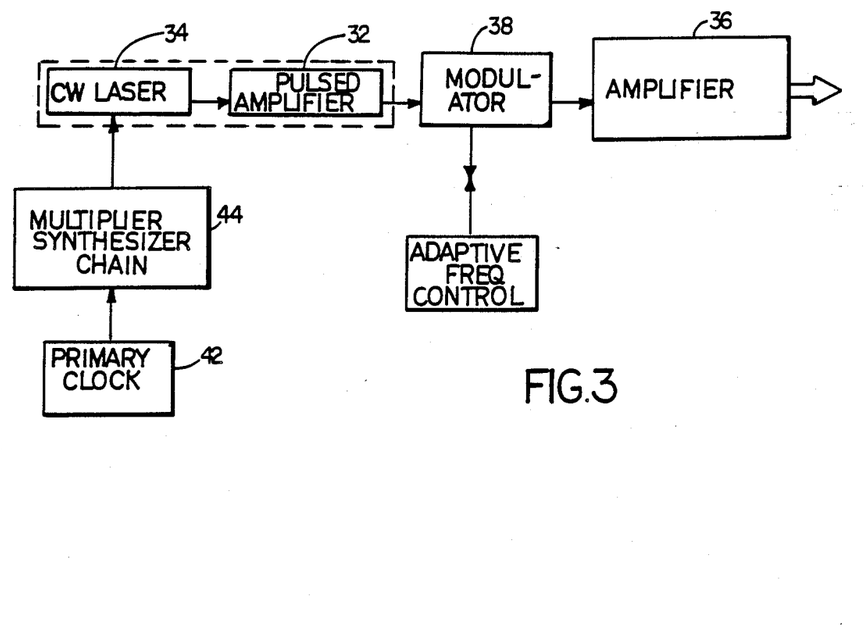
FIG. 3 is a partial block diagram of one transmitter embodiment.

An electro-optics (CdTe) modulator 38 between the two amplifiers provides the waveform modulation necessary for range measurements. The frequency of the CW laser 34 is controlled by an optical clock 42 coupled to the laser through a multiplier synthesizer chain 44 as already described. This transmitter provides the needed 1–2 kHz stability for 1 cm/sec velocity resolution.

Another arrangement (FIG. 4) makes use of an injection-controlled pulsed $CO_2$ laser 46 as the source of the radiated signal. Such a laser has considerable frequency instability, of the order of 2 MHz or more. The fluctuating output pulses are converted to highly stable non-fluctuating pulses. An electro optical processor at the output of the injection controlled laser 46 senses the frequency fluctuations of the laser signal, generates an exactly complementary signal which is recombined with the original laser pulse to remove the frequency instabilities. The frequency processor also serves as a modulator for waveform generation necessary for range measurements.

Figure 4:
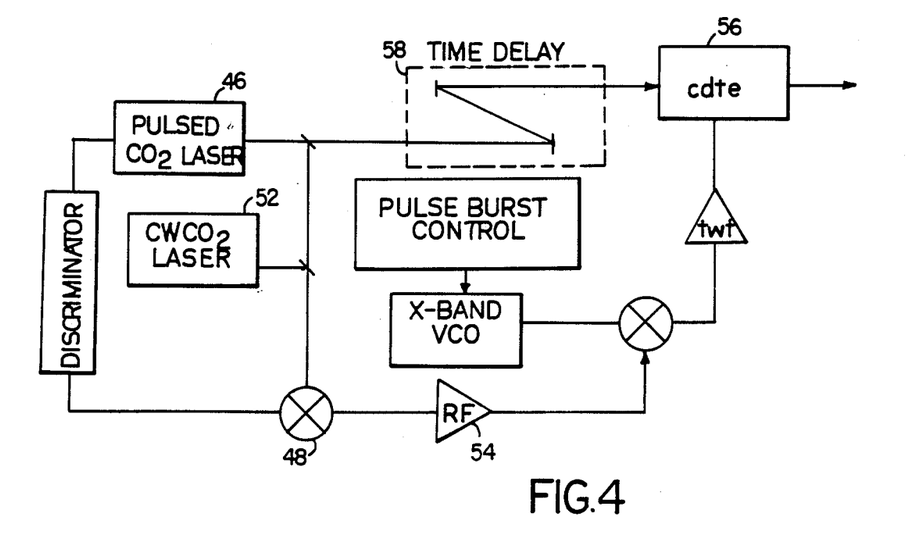
FIG. 4 is a partial block diagram of a transmitter and adaptive frequency control circuits.

The processor uses known electro-optics modulators and well established microwave technology. A portion of the signal from the pulsed laser 46 is combined in a mixer 48 with the signal from a highly stable CW $CO_2$ laser 52. The resulting signal which represents the difference signal is passed through an amplifier 54 and modulated with an X-band pulse control signal to facilitate range measurements. The amplifier difference signal is recombined in a cadmium-telurium modulator 56 with the original pulse from the laser 46 which has been delayed by a time delay unit 58 so that the original pulse and the generated compensation pulse arrive at the modulator 56 at precisely the same instant. The frequency stabilization procedure is applicable to any pulsed laser, including excimer and solid state lasers, that can be injection controlled with an external low power injection source. Stabilizing circuits performing these functions are described more fully in my U.S. Pat. No. 4,329,664, entitled "Generation of Stable Frequency Radiation at an Optical Frequency", issued May 11, 1982.

With a KrF or XeCl excimer laser as the source in a range/Doppler laser radar, angular resolution is markedly improved over that obtainable with a $CO_2$ laser. High resolution coherent imaging of a remote target on the receiver image plane containing a two-dimensional mixer array becomes feasible.

Summarizing one embodiment of the invention, the transmitter 2 performs two primary functions: (a) it illuminates a number of targets with each pulse for range and Doppler observation by the intercepting receivers and (b) it conducts range and Doppler measurements on each of the intercepting receivers 6 by means of the signal returned from the retro reflector 8. The transmitter 2 knows at each moment the coordinate and trajectory of each of its intercepting receivers. In turn, each receiver module 6, having performed its discrimination function, determines the target coordinate and trajectory, by means of range/Doppler, with respect to its own coordinate and trajectory. This information is relayed by microwave communication from a signal processor and transmitter 20 (FIG. 2) to the transmitter 2 where it is combined with the transmitter information to permit tracking a target with high accuracy. One important advantage is the greatly increased observational resolution of the receivers at relatively close range to the target.

Figure 2:
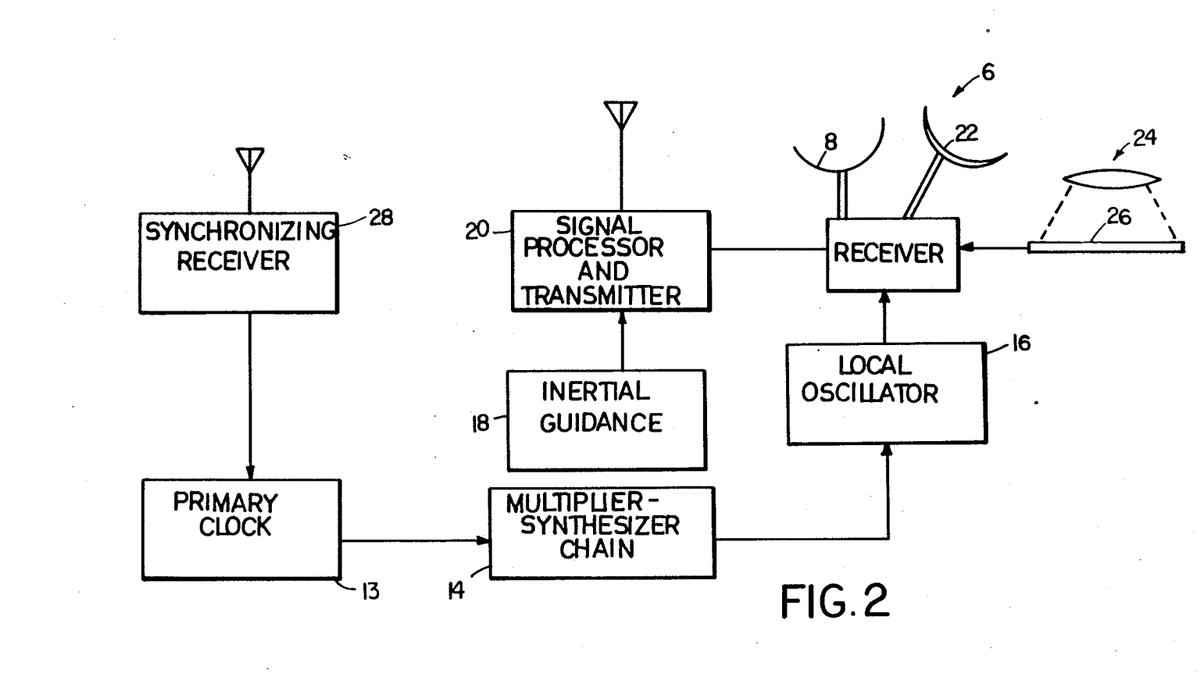
FIG. 2 is a partial block diagram of one of the receiver modules of FIG. 1.

To receive the radar signals, a coherent imaging device is employed in which a two-dimensional array of mixer elements is placed in the optics image plane with the same local oscillator illuminating the entire array (FIG. 2). (Such an array is described in U.S. Pat. No. 3,947,630 issued March 30, 1976, which disclosure is incorporated herein by reference.) Each element in the array 26 provides range/Doppler information for the target image focused upon it. In this way each receiver has a broad fov as determined by the size of the array: its resolution for each mixer element on the image plane, however, is as high as the diffraction effect of the receiver optics will permit. A one-meter receiver optics at 100 km range will resolve an individual target several square meters in area at a 10 um $CO_2$ wavelength. With a near-UV excimer laser (KrF at 0.25 um) it is possible to resolve an area of several square centimeters on the target surface. The electrical heterodyne signal generated in each element of the array is analyzed, by sequential scanning, for range/Doppler information on each target.

The beam from the transmitter 2 may consist of two simultaneous pulses at closely spaced but different frequencies. In this case, the image array plane 26 is illuminated by two laser signals having similarly different frequencies directly related to the two transmitter frequencies. The beat frequencies generated in the image plane are analyzed holographically to provide complete information about each target within the fov of the receiver.

In another embodiment, the receivers 6 are positioned at or near the location of the transmitter 2 but are dispersed over a substantial area so that each receiver views each target from a slightly different angle. A single high-power laser pulse illuminating a target and returning signals to a number of receivers provides the basis for both coordinate and trajectory information.

I claim:

1. In a laser radar-Doppler system for detecting remote targets each independently capable of generating a return signal when illuminated by a laser beam, the combination comprising
    a laser transmitter including
    means for transmitting a pulsed target-illuminating laser beam having a beamwidth selected so that said beam is capable of simultaneously illuminating a plurality of said targets,
    a reference oscillator, and
    first stabilizing means for maintaining a predetermined relationship between the frequency of said oscillator and the frequency of said illuminating beam, and
    a plurality of spaced receiver modules separate from said transmitter and each including
    means for receiving the return laser beam from at least one of said targets,
    a local oscillator,
    second stabilizing means independent of said first stabilizing means for precisely controlling the frequency of said local oscillator to bear a predetermined fixed relationship with the frequency of said reference oscillator in said transmitter, and
    means for comparing the frequency of the return laser beam with the frequency of said local oscillator.

2. The combination as claimed in claim 1 wherein said receivers are remotely positioned from said transmitter and are nearer to the region of said targets than to said transmitter.

3. The system of claim 2 wherein said transmitter is located a predetermined distance from said targets and each said receiver is located on the order of one-tenth of said predetermined distance from said targets.

4. The combination as claimed in claim 1 wherein said first stabilizing means includes an optical clock having
    means responsive to molecular resonance and
    an optical synthesizer chain for locking the frequency of said first stabilizing means to said molecular resonance.

5. The combination as claimed in claim 1 wherein each of said receiver modules includes a transmitter for relaying data to said laser transmitter for evaluation.

6. The combination as claimed in claim 1 wherein said means for transmitting a pulsed target-illuminating beam includes
    means for generating a laser beam having a pulse energy of 100–500 Joules.

7. The combination as claimed in claim 6 wherein said means for transmitting a pulsed target-illuminating beam includes
    means for generating laser pulses having a duration between 10 and 100 usec.

8. The combination as claimed in claim 1 wherein said means for transmitting a pulsed target-illuminating beam includes
    means for generating laser pulses having a frequency variation under operating conditions of less than 10 kHz.

9. The combination as claimed in claim 1 wherein said receiver module includes a low resolution radar detector for directing said receiver module in the general direction of one of said targets.

10. The combination as claimed in claim 1 wherein said transmitter comprises
    a CW laser,
    a pulsed oscillator power amplifier laser coupled to said CW laser, and
    a second power amplifier coupled to said pulsed oscillator power amplifier.

11. The combination as claimed in claim 1 wherein said transmitter includes an injection controlled $CO_2$ laser.

12. The combination as claimed in claim 1 wherein said transmitter includes an injection-controlled excimer laser.

13. The combination as claimed in claim 12 wherein said excimer laser is a XeCl laser.

14. The combination as claimed in claim 1 wherein each of said stabilizing means is an optical clock.

15. The combination as claimed in claim 14 wherein said means for transmitting a pulsed target-illuminating beam includes
    means for generating laser pulses having a maximum frequency variation under operating conditions of not more than 2 kHz.

16. The combination as claimed in claim 15 wherein each of said optical clocks includes
    timing means accurate to within one part in $10^{11}$.

17. The combination as claimed in claim 16 wherein
each of said optical clocks is a He-Ne 3.39 um gas methane clock, and
said transmitter includes
a low-power CW $CO_2$ laser, and
a multiplier/synthesizer chain for locking said laser to said methane clock.

18. The combination as claimed in claim 16 wherein said clock comprises a CW laser stabilized against a narrow resonance of an external gas.

19. The combination as claimed in claim 1 wherein said transmitter includes means for generating a second laser beam directed toward one of said receivers, and
said receiver includes a retro-reflector for returning laser signals to said transmitter thereby to provide coordinate and trajectory information of said receiver.

20. The combination as claimed in claim 1 wherein each of said receivers includes a two-dimensional optics image plane having an array of mixer elements carried by said receiver,
a local laser oscillator uniformly illuminating said array, and
rf electronic circuit means for sequentially scanning said array and analyzing the heterodyne signal generated in each element of said array for range/Doppler information concerning a plurality of targets.

21. The combination as claimed in claim 20 wherein said mixer elements are in the form of a phased array having spacing bearing a predetermined relationship to the wavelength of said transmitted beam, and
holographic means for analyzing the distribution of phase and amplitude of the received signals on said array thereby to determine directional information with respect to each of such targets.

22. The combination claimed in claim 20 wherein said illuminating beam of said transmitter consists of two simultaneously transmitted closely-spaced wavelengths,
said local oscillator illuminating said array includes means for generating two closely-spaced wavelengths in direct relationship to the frequencies of said transmitter beam, and including
means for holographic analysis of the elements of said array to obtain phase and amplitude distribution at the beat frequency and wavelengths of the two simultaneously transmitted beams.

23. A method of detecting and tracking multiple targets, each independently capable of generating a return signal when illuminated by a laser beam, comprising the steps of
generating a first pulsed laser signal, the first laser signal having a predetermined frequency,
locking said first laser signal to a first stable timing means to stabilize said first laser signal at said predetermined frequency,
transmitting said first laser signal from a transmitter along a directed path toward said multiple targets and providing said transmitted first laser signal with a beamwidth selected to simultaneously illuminate a plurality of said multiple targets with said pulse,
generating a local oscillator signal at a receiver separate from said transmitter,
locking the frequency of said local oscillator signal to a second stable timing means in said receiver independent of said first stable timing means to stabilize the frequency of said local oscillator signal and maintain a predetermined frequency relationship with said predetermined frequency of said first laser signal,
determining the location of said receiver with respect to said transmitter,
heterodyning return signals of the first laser signal from said plurality of targets with said local oscillator signal,
measuring the time delay of said return signals to determine the distances of said plurality of targets from said receiver, and
measuring the Doppler shifts in the predetermined frequency induced by motion of said plurality of targets based on said heterodyning.

24. The method as claimed in claim 23 wherein said first and second timing means are optical clocks.

25. The method as claimed in claim 23 wherein said receiver is positioned remotely from said transmitter.

26. The method of claim 25 wherein said transmitter is located a predetermined distance from said targets and said receiver is located on the order of one-tenth of said predetermined distance from said targets.

27. The method as claimed in claim 25 wherein a plurality of dispersed receivers are provided, each performing independently substantially the same steps as said receiver.

28. The method as claimed in claim 24 wherein the step of locking said laser signal to said first optical clock includes the step of
passing the signal from said optical clock through an optical synthesizer chain.

29. The method as claimed in claim 25 wherein the step of determining the location of said receiver includes the steps of
transmitting a second laser signal from said transmitter to said receiver,
reflecting said second laser signal from said receiver, and
receiving said reflected signal at the site of said transmitter.

30. The method as claimed in claim 29 including the steps of
providing a low resolution laser radar at the location of said receiver,
locating the approximate position of one of said targets, and
orienting said receiver to receive signals of said transmitter returned from said target.

31. The method as claimed in claim 25 including the steps of
providing a coherent imaging device having a two dimensional array of mixer elements in said receiver,
focusing the image of at least one of said plurality of targets on said array, and
impacting said target with a physical force thereby to determine the character of said target from the reaction thereof to said physical force.

32. The method as claimed in claim 25 including the steps of
providing a plurality of receivers, each having the characteristics of said receiver,
positioning said receivers in dispersed locations, receiving return signals of said first laser signal pulse from said plurality of targets at each of said receivers, and measuring the Doppler shift from the predetermined frequency and time delay of each of said return signals, thereby to determine from a single first said laser signal pulse the coordinates and trajectories of said plurality of targets.

33. The method of claim 23 including the steps of transmitting a second laser signal closely-spaced in wavelength from said first laser signal, providing in said receiver an optical image plane having a plurality of individual laser-responsive elements arranged in a phased array, illuminating said array with two closely spaced laser signals bearing a fixed predetermined relationship to the frequencies of said first and second laser beams, and analyzing the beat frequencies produced in said array to provide holographic information in connection with said plurality targets.

34. A laser radar-Doppler system for detecting remote targets, comprising (a) a laser transmitter including means for transmitting a pulsed laser beam having a predetermined frequency and having a beamwidth selected so that said beam is capable of simultaneously illuminating a plurality of said remote targets, a reference oscillator, and first stabilizing means for maintaining a predetermined relationship between the frequency of said reference oscillator and the frequency of said illuminating beam, and (b) at least one receiver module separate from said transmitter and including means for receiving reflection signals of said pulsed laser beam from at least one of said targets, a local oscillator, second stabilizing means operating independently of the operation of said first stabilizing means for precisely controlling the frequency of said local oscillator to bear a predetermined fixed relationship with the frequency of said reference oscillator in said transmitter, and means for comparing the frequency of the reflection signals with the frequency of said local oscillator to determine the Doppler shift in the predetermined frequency induced by motion of said target with respect to said receiver.

35. The combination of claim 34 wherein said at least one receiver is remotely positioned from said transmitter and is nearer to a region of said targets than to said transmitter.

36. The system of claim 35 wherein said transmitter is located a predetermined distance from said targets and said at least one receiver is located on the order of one-tenth of said predetermined distance from said targets.

37. The combination of claim 34 wherein
said first stabilizing means includes an optical clock having
means for responding to a molecular resonance and
an optical synthesizer chain for locking the frequency of said first stabilizing means to said molecular resonance.

38. The combination of claim 34 wherein
said at least one receiver module includes a transmitter for relaying data to said laser transmitter for evaluation.

39. The combination of claim 34 wherein said laser transmitter includes means for generating said pulsed laser beam with a pulse energy of 100–500 Joules.

40. The combination of claim 39 wherein said laser transmitter includes means for generating said pulsed laser beam with pulse durations of between 10 $\mu$sec and 100 $\mu$sec.

41. The combination of claim 34 wherein said laser transmitter includes means for generating said pulsed laser beam with pulses having a predetermined frequency variation therebetween of less than 10 kHz.

42. The combination of claim 34 wherein
said at least one receiver module includes a low resolution radar detector for directing said at least one receiver module in the general direction of one of said targets.

43. The comination of claim 34 wherein
said laser transmitter comprises
a CW laser,
a pulsed oscillator power amplifier laser coupled to said CW laser, and
a second power amplifier coupled to said pulsed oscillator power amplifier.

44. The combination of claim 34 wherein
said laser transmitter includes an injection controlled $CO_2$ laser.

45. The combination of claim 34 wherein
said laser transmitter includes an injection-controlled excimer laser.

46. The combination of claim 45 wherein
said excimer laser is a XeCl laser.

47. The combination of claim 34 wherein said first and second stabilizing means each comprise an optical clock.

48. The combination of claim 47 wherein said laser transmitter includes means for generating said pulsed laser beam with pulses having a predetermined maximum frequency variation of not more than 2 kHz.

49. The combination of claim 48 wherein each of said optical clocks includes a timer accurate to within one part in $10^{11}$.

50. The combination of claim 49 wherein
each of said optical clocks comprises a He-Ne 3.39 um gas methane clock having a predetermined operating frequency, and
said laser transmitter includes
a low-power CW $CO_2$ laser, and
a multiplier/synthesizer chain for frequency locking said low-power CW $CO_2$ laser to the operating frequency of said methane clock of said first stabilizing means.

51. The combination of claim 49 wherein
each said optical clock comprises a CW laser stabilized against a narrow resonance of an external gas.

52. The combination of claim 34 wherein
said laser transmitter includes means for generating a second laser beam directed toward said at least one receiver, and
said receiver includes a retro-reflector for returning reflections of said second laser beam to said transmitter thereby to provide coordinate and trajectory information of said receiver.

53. The combination of claim 34 wherein
said at least one receiver includes a two-dimensional optics image plane having an array of mixer elements carried by said receiver, said target reflected signals of said pulsed laser beam being incident on said array, and said local oscillator uniformly illuminating said array, and RF electronic circuit means for sequentially scanning said array and analyzing heterodyne signals generated by said mixer elements of said array between said target reflected signals and said local oscillator for deriving range/Doppler information concerning a plurality of said targets.

54. The combination of claim 53 wherein said mixer elements are in the form of a phased array having spacing bearing a predetermined relationship to the wavelength of said transmitted laser beam, and said at least one receiver further comprises holographic means for analyzing the distribution of phase and amplitude of the received target-reflected signals on said array to determine directional information with respect to each of said targets.

55. The combination of claim 53 wherein said laser transmitter comprises means for producing a pulsed laser beam comprising two simultaneously transmitted, closely-spaced wavelengths, said local oscillator includes means for generating two closely-spaced wavelengths corresponding to the two wavelengths of said transmitted beam, and said receiver further includes means for holographically analyzing the elements of said array to obtain phase and amplitude distribution at beat frequencies between target-reflected returns of the two transmitted wavelengths and the corresponding two wavelengths produced by said local oscillator.

56. A laser radar-Doppler system for detecting remote targets, comprising (a) a laser transmitter including
means for transmitting a pulsed laser beam having a predetermined frequency and capable of simultaneously illuminating a plurality of said remote targets,
a reference oscillator, and
first stabilizing means for maintaining a predetermined relationship between the frequency of said reference oscillator and the frequency of said illuminating beam, and (b) at least one receiver module separate from said transmitter and including
means for receiving reflection signals of said pulsed laser beam from said targets,
a local oscillator,
second stabilizing means operating independently of the operation of said first stabilizing means for precisely controlling the frequency of said local oscillator to bear a predetermined fixed relationship with the frequency of said reference oscillator in said transmitter, and
means for comparing the frequency of the reflection signals with the frequency of said local oscillator to determine the Doppler shifts in the predetermined frequency induced by motion of said targets with respect to said receiver, said comparing means comprising means for resolving images of said plurality of targets from said plurality of reflection signals to enable determination of the directions of said targets with respect to said receiver module.

57. The system of claim 56 wherein said means for resolving comprises means for imaging said reflection signals onto an array of elements that perform the frequency comparison.

58. A method of detecting and tracking multiple targets, each independently capable of generating a return signal when illuminated by a laser beam, comprising the steps of generating a first pulsed laser signal, the first laser signal having a predetermined frequency, locking said first laser signal to a first stable timing means to stabilize said first laser signal at said predetermined frequency, transmitting said first laser signal from a transmitter along a directed path toward said multiple targets to simultaneously illuminate a plurality of said multiple targets with said pulse, generating a local oscillator signal at a receiver separate from said transmitter, locking the frequency of said local oscillator signal to a second stable timing means in said receiver independent of said first stable timing means to stabilize the frequency of said local oscillator signal and maintain a predetermined frequency relationship with said predetermined frequency of said first laser signal, determining the location of said receiver with respect to said transmitter, imaging return signals of the first laser signal reflected by said plurality of targets onto an array of detector elements, illuminating said array of elements with said local oscillator signal and heterodyning said return signals with said local oscillator signal at the detector elements, and measuring the Doppler shifts in the predetermined frequency induced by motion of said plurality of targets based on said heterodyning.

59. The method of claim 58 wherein each element in said array is illuminated by said local oscillator signal.

* * * * *